Aug. 11, 1942.  L. F. CARTER  2,292,989
GYROSCOPIC HORIZON
Filed Oct. 21, 1938
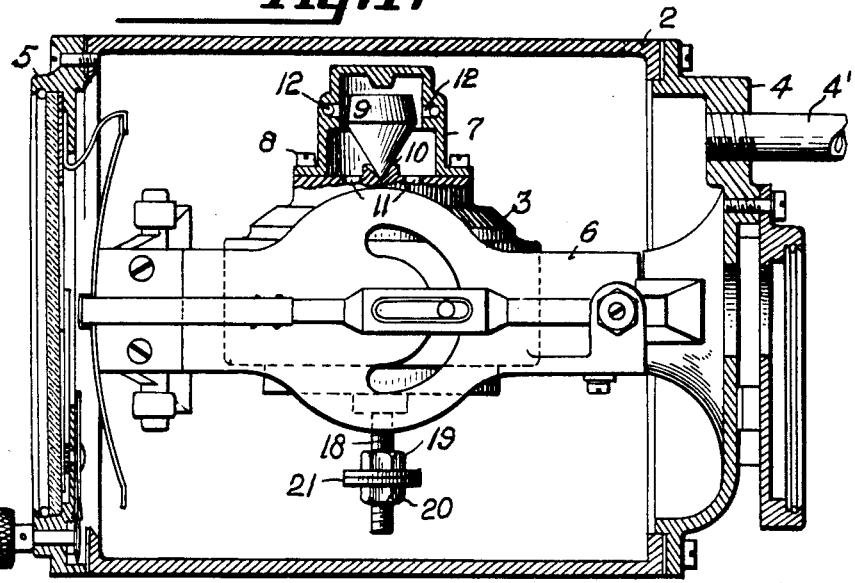
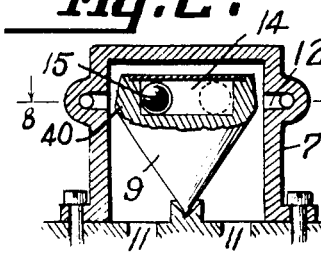
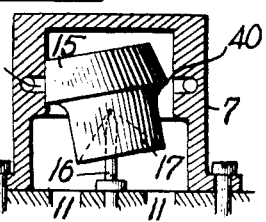
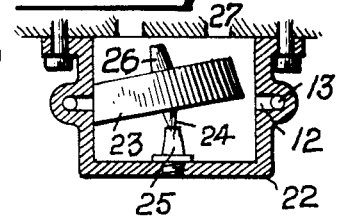
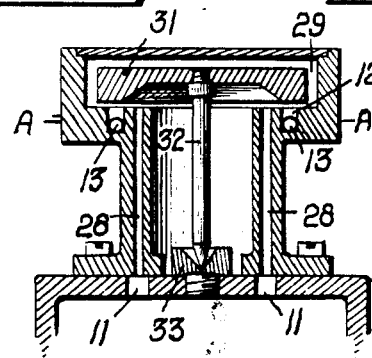
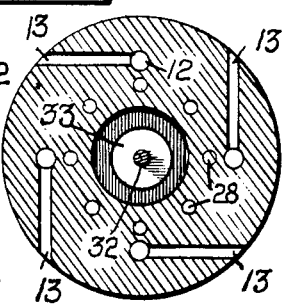
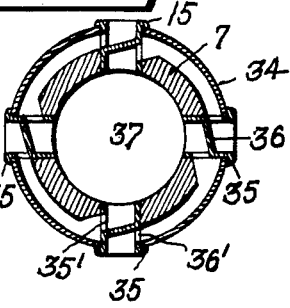
INVENTOR
LESLIE F. CARTER
BY
HIS ATTORNEY.

Patented Aug. 11, 1942

2,292,989

UNITED STATES PATENT OFFICE 2,292,989

GYROSCOPIC HORIZON

Leslie F. Carter, Leonia, N. J., assignor to Sperry Gyroscope Company, Inc., Brooklyn, N. Y., a corporation of New York Application October 21, 1938, Serial No. 236,137

11 Claims. (Cl. 74—5)

This invention relates to gyro-verticals or artificial horizons. While of general application to all such gyroscopic instruments, the invention is especially adapted for gyro-verticals or artificial horizons for aircraft, where such instruments are used as indicators to guide the aviator in blind flying or for furnishing a base line for automatic flight.

More specifically, this invention relates to a device for automatically erecting a gyro-vertical to the true vertical and for holding it there under all conditions of roll, pitch and yaw of the ship on which the instrument is carried.

The device embodied in this invention is applicable to any gryo-vertical and is shown in its present form as applied to an artificial horizon of the type described in detail in U. S. Patents 1,982,636 and 2,044,150, issued December 4, 1934, and June 6, 1936, respectively, to B. G. Carlson. A description of the working parts of the gyroscope itself and of the indicator to make its motions clearly visible and easy to interpret from the outside is dispensed with in this specification. My novel erection device, instead of using the convential pendulum as a gravity responsive control means, employs a top heavy body or inverted pendulum, which is normally kept balanced on a point support in unstable equilibrium, and which is extremely sensitive to any tilt of its support.

In the drawing,

Fig. 1 shows a vertical cross section through the housing and the erector of an artificial horizon.

Figs. 2, 3, 4, and 5 show modifications of the erector used with the artificial horizon shown in Fig. 1.

Fig. 6 is a horizontal cross section along line A—A of Fig. 5.

Fig. 7 shows a modified cross section through the housing of the erector.

Fig. 8 is a horizontal section through the upper part of the gyro casing taken on line 8—8 of Fig. 2.

In Fig. 1, 2 is the housing of the artificial horizon 3, closed by end caps 4 and 5 in conventional manner. The housing is normally continuously exhausted by a vacuum pump (not shown) through pipe 4'. The gyroscope or gyroscopic element is contained in the casing 3, the rotor (not shown) having a normally vertical spin axis. A normally horizontal gimbal ring 6 is pivoted for oscillation around the horizontal axis and carries the gyroscope 3 or gyroscopic element in bearings, allowing it to oscillate around another horizontal axis perpendicular to the first-named axis, said element being thus universally supported, which mounting is said to give the gyro rotor three degrees of freedom. A casing 7 is attached to the top of the casing 3 and held in place by screws 8. A cone or top shaped body 9 is held in unstable equilibrium inside of the casing 7 and rests in a conical depression 10, where it is pivotally supported on the pointed apex of its conical body. The air which is used to drive the gyroscope rotor escapes through apertures 11 into the casing 7 and escapes through ports 12 to the interior of housing 2. Before entering ports 12, however, the air must squeeze between the inverted base circle 40 of the cone or top and the inner wall of casing 7, and in doing so, the air flow yieldingly centers the cone 9, acting as a yielding or resilient centralizing or erecting means, and thereby preventing it from falling over sideways, as long as the gyro casing 3 maintains a vertical axis. After passing this base circle or the maximum diameter of the cone, the air escapes equally through all apertures 12 (which are equidistant around the interior of enclosure 7) as long as the cone is vertical. Above the base circle 40 the cone is shown as tapered upwardly somewhat, so that when the cone falls over sidewise against the casing, its upper edge will close the adjacent port 12 at top and bottom (see Figs. 3 and 4).

As shown in Fig. 6, the ports 12 communicate with the outer air through channels or holes 13 in such a way that the air escapes tangentially, or at 90° to the ports 12. Normally, with the top 9 held in center by the escaping air, all four passages 13 emit equal amounts of air and the reaction from the jets produces no torque around any horizontal axis. If now the gyro casing 3 tilts to one side or the other, due to disturbing influences as, for instance, friction or the rotation of the earth, the cone 9 will lean over in the direction of tilt, but through a larger angle than the gyro casing 3 because the cone is in unstable equilibrium.

The cone 9, therefore, will fall over far enough to close one port 12 entirely, or to reduce the air escaping through two of these passages to such an extent that the normally balanced reaction of the jets issuing from passages 13 is unbalanced so that a torque component around the horizontal axis is developed, acting at an angle of 90° with respect to the tilt of the gyroscope and in such a manner as to precess the gyroscope back to the vertical. As soon as the gyro reaches the vertical, the tilt of the cone 9 will be eliminated and it will again be perfectly centered as the gyro axis becomes vertical.

Actual experiments show that the sensitivity of this device is extremely high, resulting in great accuracy of the erection. It has also been proved that the cone 9 will not spin under the influence of the air, but will remain stationary, tilting back and forth on its point support and maintaining an extremely high degree of sensitivity.

Fig. 2 shows a modification of the erector. The cone structure 9 has a circular recess 14 in which a ball 15 has been placed. This ball serves the purpose of accentuating any slight tilt of the cone 9, by following the tilt and thereby displacing a comparatively large amount of weight, so that the cone 9 definitely leans against the housing 7 even on the smallest tilts. The action of the cone 9 is otherwise identical with the one described in Fig. 1.

Fig. 3 shows another modification of the cone 9 in showing a mass 15 unstably balanced on a pin 16. The mass 15 has a large conical recess 17 at the apex of which it is supported by the pin 16.

It is obvious that instead of placing the erector on top of the gyro housing, as shown in Fig. 1, it also may be attached to the bottom of the casing 3. In that case, the stud 18, with the balancing nuts 19 and 20 and the weights 21, is removed and placed on top of the housing, while the erector, as shown in Fig. 4, is attached to the bottom.

This erector comprises a casing 22 in which a mass or shutter 23 is balanced on a pivot 24. The pivot 24 is located in a conical recess in the screw type socket 25, and a tip 26, forming part of the top 23, is so dimensioned that the cone cannot jump out of its bearing due to shock or vibration. The used air from the gyro casing escapes downwardly through passages 27, forces the shutter 23 into a central unstable position and escapes again through passages 12 and holes 13 as described before.

Fig. 5 shows a further modification of an erector placed on top of the gyro casing. In this modification the air from the gyro, which passes through the holes 11, is led upwardly through channels 28 until it escapes into a circular channel 29 formed as a recess in the housing 30. The air escapes through passages 12 and holes 13, but in doing so, tends to keep the disc 31 balanced and erect. This disc is supported in unstable equilibrium by a pin 32 which rests in the conical cup 33 on a pin point. Tilting of the gyroscope in this case will cause the disc 31 to lean over and partly or completely close some of the passages 12, causing again an unbalanced torque around the horizontal axis to erect the gyroscope.

Fig. 6 shows the relative location of the holes 28, the passages 12 and the holes 13 in all figures.

In Fig. 7 a modification of the design of the housings 7 and 22 is shown. A part of the casting containing the holes 12 and 13 in the afore described cases has been replaced by a separate ring 34. Short pieces of tubing 35 have been inserted through holes 12 in the ring 34 and the body 7, and have been provided with a slanted dividing wall 36 and apertures 35' and 36' so that air coming from the interior 37 of the casing 7 is forced to enter the inner part of one of the tubes 35 and then escapes through the outer part of another one of the tubes 35. In this manner, the air is not only deflected 90° from its original course, but directed radially instead of tangentially so that no torque around the vertical is created. This has the advantage of eliminating the forces on the gimbal bearings necessary to overcome said torque.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a gyro vertical, a sensitive gyroscopic element with normally vertical axis, means for universally suspending said element in substantially neutral equilibrium for tilting around any horizontal axis, a casing on said element having jet forming ports, an air supply therefore, and gravity responsive means in said casing normally pivotally supported in unstable equilibrium, whereby upon tilt of said element said gravity responsive means loses its equilibrium and differentially controls said ports to develop erecting torques in a plane normal to the axis of said tilt.

2. In an artificial horizon, as claimed in claim 1, a secondary gravity responsive means supported on said first named gravity responsive means and adapted to increase the instability of said last named means when same tilts.

3. In a gyro vertical, a sensitive gyroscopic element with normally vertical axis, means for universally suspending said element in substantially neutral equilibrium for tilting around any horizontal axis, a casing on said element having jet forming ports, an air supply therefore, an inverted pendulum in said casing, and means for normally keeping said pendulum erect in unstable equilibrium equidistant from and adjacent to said ports, whereby upon tilt of said element said pendulum loses its equilibrium and differentially controls said exhaust ports so as to cause jet reaction torques in a plane normal to the plane of said tilt and in a direction to erect said element.

4. In a gyro vertical, a sensitive gyroscopic element with normally vertical axis, means for universally suspending said element in substantially neutral equilibrium for tilting around any horizontal axis, a casing on said element, an inverted pendulum pivoted in said casing in unstable equilibrium, means for normally keeping said pendulum erect, and a plurality of normally balanced tangentially arranged reactive means for creating erecting torques around any horizontal axis normal to said tilt axis, said pendulum differentially unbalancing said balanced means as said equilibrium is destroyed when said element tilts.

5. In an air erector for gyro-verticals, a universally mounted gyroscopic element, a top-heavy member mounted on said element in unstable equilibrium on a point support below its center of gravity, a casing closely surrounding said member, means for causing an air flow between said casing and member around the periphery of said member sufficient to yieldingly maintain said member erect only when the center of gravity thereof lies directly above its point of support, a plurality of outlets 12 in said casing symmetrically positioned around and closely adjacent said member whereby the flow of air through said outlets is controlled by said member, and a jet discharge orifice 13 communicating with and so positioned with relation to each outlet that, on relative tilt of said member and gyroscopic element, the jet reaction through said orifices 13 is varied to erect said gyroscopic element.

6. In an erector for a gyro-vertical, a gyroscopic element, a hollow cylindrical enclosure on said element, means whereby air is forced out of said enclosure through a plurality of coplanar apertures 12, a plurality of ports 13 in said enclosure respectively connected with said apertures and forming normally balanced reactive air jets, and gravity responsive top-heavy means having a circular periphery in said enclosure for differentially controlling the air entering said apertures and normally kept centered in said enclosure and erect in unstable equilibrium by the air passing between said enclosure and the periphery of said top-heavy means, said gravity responsive means losing its equilibrium upon tilt of said element, whereby the reactive forces from said jets are unbalanced and cause erection of said element.

7. In an air erector for gyro-verticals, a gyroscopic element, a top-heavy member mounted in unstable equilibrium thereon, a casing closely surrounding said member having a plurality of outlet ports 12 therein adjacent the top of said member and having exhaust ports 13 positioned substantially 90° from said outlet ports and in communication therewith, and means for causing an air flow between said casing and member and out of said outlet and exhaust ports, whereby a slight erecting force is exerted on said member and whereby, upon tilt of said element, said member moves to the low side and reduces the air flow through the port or ports 12 at that side, thereby erecting the gyroscope.

8. In a gyro-vertical, a sensitive gyroscopic element with a normally vertical spin axis, a bearing frame for said element, means for universally suspending said bearing frame in substantially neutral equilibrium for tilting around any horizontal axis, a casing on said bearing frame having jet forming ports, an air supply therefor, and gravity responsive means in said casing supported in unstable equilibrium so that, upon tilt of said bearing frame, said gravity responsive means moves to the low side thereof and differentially controls said ports to develop erecting torques in a plane normal to the axis of said tilt.

9. In an erector for gyro-verticals, a gyroscopic element, a member movably mounted thereon in unstable equilibrium whereby it moves to the low side of said element on tilt, a casing closely surrounding said member having a plurality of outlet ports 12 therein adjacent said member, an exhaust port in said casing communicating with each of the outlet ports and positioned in right angle relation with respect thereto, and means for causing an air flow between said casing and member and out of said outlet and exhaust ports, whereby a slight centralizing force is exerted on said member and whereby, upon tilt of said element, said member moves to the low side and reduces the air flow through the port or ports 12 at that side, thereby erecting the gyroscopic element.

10. In an erector for a gyro-vertical, a gyroscopic element, a hollow cylindrical enclosure on said element, means whereby air is forced out of said enclosure through a plurality of coplanar apertures 12 in said enclosure, a port communicating with each of said coplanar apertures providing normally balanced reactive air jets, and gravity responsive means having a circular periphery in said enclosure for differentially controlling the air entering said apertures and normally kept centered in said enclosure by the air passing between said enclosure and the periphery of said means, the ports being so positioned with relation to the apertures that when said means moves to the low side, upon tilt of said element, the reactive forces from said jets are unbalanced and cause erection of said element.

11. In an erector for a gyro-vertical, a gyroscopic element, a hollow cylindrical enclosure on said element, means whereby air is forced out of said enclosure through a plurality of coplanar apertures in said enclosure, a plurality of ports respectively connected with said apertures and forming normally balanced reactive air jets, and a member including a ball in said enclosure for differentially controlling the air entering said apertures and normally kept centered in said enclosure by the air passing between said enclosure and member, whereby upon relative tilt of said member and said enclosure the reactive forces from said jets are unbalanced and cause erection of said element.

LESLIE F. CARTER.